(12) United States Patent
Reiners et al.

(10) Patent No.: US 9,376,729 B2
(45) Date of Patent: Jun. 28, 2016

(54) COMPOSITIONS COMPRISING AT LEAST ONE COMPOUND CONTAINING A CARBAMOYL SULFONATE GROUP AND USE OF THE SAME AS TANNING AGENTS

(75) Inventors: Jürgen Reiners, Leverkusen (DE); Christopher Tysoe, Leverkusen (DE); Jan-Dieter Wiechmann, Bergisch-Gladbach (DE); Claudia Krüger, Leverkusen (DE); Rafael Grosch, Leverkusen (DE); Franz Heinzelmann, Leverkusen (DE); Michael Ebbinghaus, Leverkusen (DE); Martin Kleban, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 180 days.

(21) Appl. No.: 13/814,053

(22) PCT Filed: Jul. 28, 2011

(86) PCT No.: PCT/EP2011/063023
§ 371 (c)(1),
(2), (4) Date: Jul. 8, 2013

(87) PCT Pub. No.: WO2012/016907
PCT Pub. Date: Feb. 9, 2012

(65) Prior Publication Data
US 2013/0288066 A1    Oct. 31, 2013

(30) Foreign Application Priority Data
Aug. 6, 2010 (EP) .................................... 10172191

(51) Int. Cl.
*C14C 3/26* (2006.01)
*C08G 18/28* (2006.01)
*C08G 18/70* (2006.01)
*C14C 3/08* (2006.01)
*C14C 3/20* (2006.01)
*C14C 3/28* (2006.01)

(52) U.S. Cl.
CPC ................ *C14C 3/26* (2013.01); *C08G 18/284* (2013.01); *C08G 18/706* (2013.01); *C14C 3/08* (2013.01); *C14C 3/20* (2013.01); *C14C 3/28* (2013.01); *Y10T 428/4935* (2015.04)

(58) Field of Classification Search
CPC .............. C14C 3/26; C14C 3/08; C14C 3/20; C14C 3/28; Y10T 428/4935; C08G 18/284; C08G 18/706

USPC .................... 428/540; 562/36; 8/94.32, 94.33
See application file for complete search history.

(56) References Cited

U.S. PATENT DOCUMENTS

| | | | |
|---|---|---|---|
| 2,923,594 A * | 2/1960 | Lieberman | C14C 3/08 8/94.11 |
| 3,976,622 A | 8/1976 | Wagner et al. | |
| 4,124,553 A | 11/1978 | Guise | |
| 4,413,997 A * | 11/1983 | Milligan et al. | C14C 3/28 8/94.21 |
| 4,837,359 A | 6/1989 | Woynar et al. | |
| 4,960,848 A | 10/1990 | Scholl et al. | |
| 4,994,541 A | 2/1991 | Dell et al. | |
| 5,076,958 A | 12/1991 | Pedain et al. | |
| 5,138,046 A | 8/1992 | Wuest et al. | |
| 5,358,560 A | 10/1994 | Hitch et al. | |
| 5,576,425 A | 11/1996 | Hill et al. | |
| 5,618,317 A | 4/1997 | Traubel et al. | |
| 5,820,634 A | 10/1998 | Traubel et al. | |
| 5,854,321 A | 12/1998 | Krause et al. | |
| 6,156,885 A | 12/2000 | Meroni et al. | |
| 7,217,752 B2 | 5/2007 | Schmucker-Castner et al. | |
| 2004/0242833 A1 | 12/2004 | Bernard | |
| 2006/0080784 A1 | 4/2006 | Ebbinghaus et al. | |

FOREIGN PATENT DOCUMENTS

| | | | |
|---|---|---|---|
| CN | 10124589 A | | 8/2008 |
| DE | 1670666 U | | 1/1954 |
| DE | 102006056479 A1 | | 5/2008 |
| EP | 0032637 A2 | | 7/1981 |
| EP | 0814168 | * | 12/1997 |
| EP | A-1647563 | * | 5/2005 |
| EP | 1647563 | * | 4/2006 |
| WO | 9814425 A1 | | 4/1998 |
| WO | WO98/14425 | * | 4/1998 |

OTHER PUBLICATIONS

Griffin, Classification of Surface-Active Agents by "HLB", J. Soc. Cosmetic Chemists, New York, New York, 1949, pp. 311, 326.
European Search Report for co-pending European Application No. 10172191, Dec. 20, 2010, two pages.
Liu, J., "Waterborne Dimethylolpropionic Acid-Diisocyanate Adducts With Alkali-Deblockable Isocyanate Groups As Pertaining Agent for Chrome Tanning", JALCA, vol. 110, 2015 pp. 43-53.

* cited by examiner

*Primary Examiner* — Leszek Kiliman

(57) ABSTRACT

Aqueous composition containing
a) at least one compound containing carbamoylsulphonate groups and
b) at least one nonionic alkoxylated polyol containing ester groups and having an HLB value of at least 13 (b1) and/or alkylglycoside (b2).

14 Claims, No Drawings

COMPOSITIONS COMPRISING AT LEAST ONE COMPOUND CONTAINING A CARBAMOYL SULFONATE GROUP AND USE OF THE SAME AS TANNING AGENTS

The invention relates to aqueous compositions containing at least one compound containing carbamoylsulphonate groups and at least one modified polyol, a method of making and the use as tanning or pretanning agent.

Isocyanates and their use as tanning agents are known in principle and are described for example in U.S. Pat. No. 2,923,594 "method of tanning", U.S. Pat. No. 4,413,997 "dicarbamoylsulfonate tanning agent" or H. Träubel, Tannings with Isocyanates [in German], parts 1 and 2, Das Leder, 1977, pages 150 ff and 181 ff.

It transpires that only isocyanates of relatively low molecular weight are effective in crosslinking the collagen molecules and hence in raising the shrinkage temperature of leather.

Yet these compounds have toxicological properties, a high vapour pressure and low solubility in water and so cannot be used in customary tanning apparatus. In addition, isocyanates in aqueous solution are quick to react, via the intermediate stages of carbamic acid and amine, to form a polymeric urea which has no tanning effect whatsoever. Therefore, temporary blocking of the isocyanate function with a protective group is advisable.

EP-A 0 590 135 and EP-A 0 814 168 describe modified isocyanates to reduce these problems. Selected isocyanates are first reacted with a polyether alcohol and then converted with bisulphite to the carbamoyl compound which is substantially inert to the reaction with water. An aqueous dispersion is obtained with sufficient stability for use in the tanning operation. However, this process has two serious disadvantages:

The reaction of isocyanate with polyether alcohol has to be carried out in the absence of water and preferably without viscosity-depressing solvents and therefore requires costly hi-tech hardware and also an additional step of synthesis.

The reaction of the polyether alcohol with the isocyanate consumes some of the isocyanate functions and thus reduces the tanning performance of the product.

EP-A-1647563 discloses aqueous compositions containing at least one compound containing carbamoylsulphonate groups and at least one alcohol alkoxylate.

The alcohol alkoxylates described therein are alkoxylated long-chain or branched alcohols. More particularly, branched ethoxylates of fatty alcohol are preferred for use as emulsifiers. However, the solutions obtained tend to undergo a phase separation at elevated ambient temperature, for example at 30-40° C., which is not reversible on cooling down. Using the products after some period of storage therefore necessitates a homogenization necessitating additional expense and particular care in commercial practice. Performance as a tanning agent is therefore adversely affected under unfavourable conditions of storage.

There accordingly continues to be a need for alternative tanning agent preparations having improved stability in storage.

There has now been found specific compositions comprising inter alia a compound containing carbamoylsulphonate groups that, surprisingly, do not have these disadvantages.

The invention accordingly provides an aqueous composition containing
a) at least one compound containing carbamoylsulphonate groups and
b) at least one nonionic alkoxylated polyol containing ester groups and having an HLB value of at least 13 (b1) and/or alkylglycoside (b2).

Component a)

Compounds containing carbamoylsulphonate groups are compounds incorporating the following structural unit:

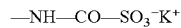

where $K^+$ is a cation equivalent.

Component a) compounds containing carbamoylsulphonate groups are preferably reaction products formed from at least one organic polyisocyanate and at least one bisulphite and/or disulphite.

Suitable organic polyisocyanates include especially aliphatic, cycloaliphatic, araliphatic, aromatic or heterocyclic polyisocyanates, as described by W. Siefken in Liebigs Annalen der Chemie 562, pages 75 to 136, for example.

Preference is given to organic polyisocyanates having an NCO functionality of 1.8 to 4.2 with a molar mass of preferably below 800 g/mol, especially organic polyisocyanates having an NCO functionality of 1.8 to 2.5 and a molar mass below 400 g/mol.

Preferred polyisocyanates are compounds of formula $Q(NCO)_n$ with an average molecular weight below 800, where n is at least 1.8, preferably from 1.8 to 4.2, Q is an aliphatic $C_4$-$C_{12}$-hydrocarbon radical, a cycloaliphatic $C_6$-$C_{15}$-hydrocarbon radical or a heterocyclic $C_2$-$C_{12}$ radical having 1 to 3 heteroatoms from the series oxygen, sulphur, nitrogen, for example (i) diisocyanates such as ethylene diisocyanate, 1,4-tetramethylene diisocyanate, 1,6-hexamethylene diisocyanate, 1,12-dodecane diisocyanate, 2-isocyanatomethyl-1,8-octamethylene diisocyanate, 1,3-diisocyanatocyclobutane, 1-isocyanato-2-isocyanatomethylcyclopentane, 1,3- and 1,4-diisocyanatocyclohexane and also any desired mixtures of these isomers, 1,2-, 1,3- and 1,4-bis(isocyanatomethyl)cyclohexane and also any desired mixtures of these isomers, 1,2-, 1,3- and 1,4bis(isocyanatoethyl)cyclohexane and also any desired mixtures of these isomers, 1,2-, 1,3- and 1,4bis(isocyanato-n-propyl)cyclohexane and also any desired mixtures of these isomers, 1-isocyanatopropyl-4-isocyanatomethylcyclohexane and isomers, 1-isocyanato-3,3,5-trimethyl-5-isocyanatomethylcyclohexane, 2,4- and 2,6-hexahydrotolylene diisocyanate and also any desired mixtures of these isomers, 2,4'- and 4,4'-diisocyanatodicyclohexylmethane and isomers, 1,3- and 1,4-phenylene diisocyanate, 2,4- and 2,6-tolylene diisocyanate and also any desired mixtures of these isomers, diphenylmethane 2,4'- and/or 4,4'-diisocyanate, naphthalene 1,5-diisocyanate, polyisocyanates containing uretdione groups such as, for example, the bis(6-isocyanatohexyl)uretdione or the 1-isocyanato-3,3,5-trimethyl-5-isocyanatomethylcyclohexane dimer containing the uretdione structure and any desired mixtures of the aforementioned polyisocyanates; (ii) trifunctional and higher polyisocyanates such as the isomers of the triisocyanatotriphenylmethane series (such as triphenylmethane 4,4',4''-trisocyanate) and their mixtures; (iii) compounds prepared by allophanatization, trimerization or biuretization of the polyisocyanates (i) and/or (ii) and having at least 2.7 isocyanate groups per molecule. Examples of polyisocyanates prepared by trimerization are the 1-isocyanato-3,3,5-trimethyl-5-isocyanatomethylcyclohexane trimer obtainable by isocyanurate formation and the polyisocyanates containing isocyanurates and obtainable by trimerization of hexamethylene diisocyanate, optionally mixed with 2,4'-diisocyanatotoluene. Examples of polyisocyanates prepared by biuretization are tris(isocyanatohexyl)-biuret and its mixtures with its higher homologues, obtainable as described in German laid-open specification DOS 23 08 015 for example. Diisocyanates are particularly preferred.

Particularly preferred polyisocyanates are those having a molecular weight of less than 400 g/mol with NCO groups attached to aliphatics or cycloaliphatics, for example 1,4-diisocyanatobutane, 1,6-diisocyanatohexane (HDI), 1,5-diisocyanato-2,2-dimethylpentane, 2,2,4- or 2,4,4-trimethyl-1,6-diisocyanatohexane (TMHI), 1,3- and 1,4-diisocyanatohexane, 1,3- and 1,4-diisocyanatocyclohexane (CHDI) and also any desired mixtures of these isomers, 1-isocyanato-2-isocyanatomethylcyclopentane, 1,2-, 1,3- and 1,4-bis(isocyanatomethyl)cyclohexane and also any desired mixtures of isomers, 1,2-, 1,3- and 1,4-bis(isocyanatoethyl)cyclohexane and also any desired mixtures of these isomers, 1,2-, 1,3- and 1,4-bis(isocyanato-n-propyl)cyclohexane and also any desired mixtures of these isomers, 1-isocyanatopropyl-4-isocyanatomethylcyclohexane and isomers, 1-isocyanato-3,3,5-trimethyl-5-isocyanatomethylcyclohexane (IPDI), 1-isocyanato-1-methyl-4-isocyanatomethylcyclohexane (IMCI), 2,4'- and 4,4'-diisocyanatodicyclohexylmethane (H$_{12}$MDI) and isomers, dimeryl diisocyanate (DDI), bis(isocyanatomethyl)bicyclo[2.2.1]heptane (NBDI), bis(isocyanatomethyl)tricyclo[5.2.1.0$^{2,6}$]decane (TCDDI) and isomers and any desired mixtures of such diisocyanates. Also araliphatic polyisocyanates such as the xylylene diisocyanates of the formulae

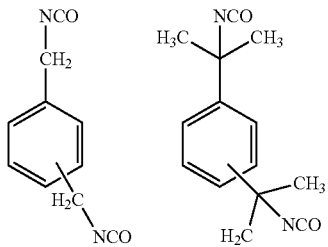

can be used.

The use of the above diisocyanates is preferred. However, it is also possible to use monofunctional aliphatic isocyanates such as, for example, butyl isocyanate, hexyl isocyanate, cyclohexyl isocyanate, stearyl isocyanate or dodecyl isocyanate and/or polyisocyanates having an average NCO functionality of 2.2 to 4.2.

The higher-functional polyisocyanates are preferably polyisocyanate mixtures consisting essentially of trimeric 1,6-diisocyanatohexane, trimeric 1,2-, 1,3- or 1,4-bis(isocyanatomethyl)cyclohexane, trimeric 1,2-, 1,3- or 1,4-bis(isocyanatoethyl)cyclohexane, trimeric 1,2-, 1,3- or 1,4-bis(isocyanato-n-propyl)cyclohexane, trimeric 1-isocyanatopropyl-4-isocyanatomethylcyclohexane and isomers, or trimeric 1-isocyanato-3,3,5-trimethyl-5-isocyanatomethylcyclohexane and optionally dimeric 1,6-diisocyanatohexane, dimeric 1,2-, 1,3- or 1,4-bis(isocyanatomethyl)cyclohexane, dimeric 1,2-, 1,3- or 1,4-bis(isocyanatoethyl)cyclohexane, dimeric 1,2-, 1,3- or 1,4-bis(isocyanato-n-propyl)cyclohexane, dimeric 1-isocyanatopropyl-4-isocyanatomethylcyclohexane and isomers, or dimeric 1-isocyanato-3,3,5-trimethyl-5-isocyanatomethylcyclohexane and the correspondingly higher homologues, including isocyanurate groups and optionally uretdione groups and having an NCO content of 19 to 24 wt %, as obtained by conventional catalytic trimerization and by isocyanurate formation of 1,6-diisocyanatohexane, 1,2-, 1,3- or 1,4-bis(isocyanatomethyl)cyclohexane, 1,2-, 1,3- or 1,4-bis(isocyanatoethyl)cyclohexane, 1,2-, 1,3- or 1,4-bis(isocyanato-n-propyl)cyclohexane, 1-isocyanatopropyl-4-isocyanatomethylcyclohexane and isomers, or of 1-isocyanato-3,3,5-trimethyl-5-isocyanatomethylcyclohexane and preferably having an (average) NCO functionality of 3.2 to 4.2.

Further suitable polyisocyanates are polyisocyanates of uretdione and/or isocyanurate, urethane and/or allophanate, biuret or oxadiazine structure which are prepared by modification of aliphatic or cycloaliphatic diisocyanates, as described by way of example in DE-A 1 670 666, DE-A 3 700 209 and DE-A 3 900 053 and EP-A 336 205 and EP-A 339 396 for example. Suitable polyisocyanates are also, for example, the polyisocyanates which contain ester groups, for example the tetrakis- or triisocyanates obtainable by reaction of pentaerythritol or trimethylolpropane silyl ethers with isocyanatocaproyl chloride (cf. DE-A 3 743 782). It is also possible to use triisocyanates such as trisisocyanatodicyclohexylmethane for example.

The use of monofunctional and of more than difunctional isocyanates is preferably restricted in both cases to amounts of, in each case, not more than 10 mol %, based on total polyisocyanates.

However, the abovementioned aliphatic, cycloaliphatic and araliphatic diisocyanates are very particularly preferred. Particular preference is given to hexamethylene diisocyanate (HDD, diisocyanatocyclohexane, 1,2-, 1,3- and 1,4-bis(isocyanatomethyl)cyclohexane and also any desired mixtures of isomers, 1,2-, 1,3- and 1,4-bis(isocyanatoethyl)cyclohexane and also any desired mixtures of these isomers, 1,2-, 1,3- and 1,4-bis(isocyanato-n-propyl)cyclohexane and also any desired mixtures of these isomers, 2,4'- and 4,4'-diisocyanatodicyclohexy)methane, 1-isocyanatopropyl-4-isocyanatomethylcyclohexan and isomers and 1-isocyanato-3,3,5-trimethyl-5-isocyanatomethylcyclohexane (IPDI).

Bisulphites and/or disulphites are preferably their alkali metal or ammonium salts, especially the sodium salts of sulphurous or, respectively, disulphurous acid, i.e. sodium hydrogensulphite (NaHSO$_3$) and sodium disulphite (Na$_2$S$_2$O$_5$), respectively.

It is also advantageous to use the other alkali metal and ammonium salts of these acids, viz. potassium bisulphite, potassium disulphite, lithium bisulphite, lithium disulphite, ammonium bisulphite, ammonium disulphite and also simple tetraalkylammonium salts of these acids, for example tetramethylammonium bisulphite, tetraethylammonium bisulphite, and so on. For blocking, the salts are preferably used in the form of aqueous solutions having solids contents of 5 to 40 wt %.

In a preferred embodiment of the invention, the compounds containing carbamoyl groups are based on aliphatic polyisocyanates such as hexamethylene diisocyanate, isophorone diisocyanate, bis(isocyanato)cyclohexane, 1,2-, 1,3- and 1,4-bis(isocyanatomethyl)cyclohexane and also any desired mixtures of isomers, 1,2-, 1,3- and 1,4-bis(isocyanatoethyl)cyclohexane and also any desired mixtures of these isomers, 1,2-, 1,3- and 1,4-bis(isocyanato-n-propyl)cyclohexane and also any desired mixtures of these isomers, 1-isocyanatopropyl-4-isocyanatomethylcyclohexane and isomers, 2,4'- and 4,4'-diisocyanatodicyclohexylmethane or nonyl triisocyanate and also mixtures thereof, but especially hexamethylene diisocyanate, 1,2-, 1,3- and 1,4-bis(isocyanatomethyl)cyclohexane and also any desired mixtures of isomers, 1,2-, 1,3- and 1,4-bis(isocyanatoethyl)cyclohexane and also any desired mixtures of these isomers, 1,2-, 1,3- and 1,4-bis(isocyanato-n-propyl)cyclohexane and also any desired mixtures of these isomers and/or isophorone diisocyanate, more preferably hexamethylene diisocyanate, isophorone diisocyanate, 1,3-bis(isocyanatomethyl)cyclohexane and 2,4'- and 4,4'-diisocyanatodicyclohexylmethane.

Component b)

Component b1)

The preferred nonionic alkoxylated polyols of component b1) which contain ester groups have an HLB value of 13 to 19, and especially of 14 to 18, the HLB value being determined by the method of Griffin, W. C.: Classification of surface active agents by HLB, J. Soc. Cosmet. Chem. 1, 1949. Preferred compounds of component (b1) also have a water solubility at 20° C. of at least 10 g per liter and especially at least 20 g per liter.

Preferred compounds of component b1) are obtainable in a conventional manner from polyols by alkoxylation and partial esterification of the hydroxyl groups with a carboxylic acid. Suitable starter polyols include for example polyhydric (cyclo)aliphatic alcohols such as glycerol, trimethylolpropane, pentaerythritol, dipentaerythritol, mono- or polysaccharide-derived polyols, preferably of molecular weight in the range from 92 to 2000. Particularly preferred starter alcohols are polyols having 3 to 10 hydroxyl groups, especially glycerol and those of sorbitan core scaffold, especially of 1,4- or 1,5-sorbitan and preferably of 1,4-sorbitan.

Preferred aqueous compositions are characterized in that the compound of component b1) is the reaction product of a polyol with at least one alkylene oxide of 2 to 6 carbon atoms, preferably in an amount of 10 to 60 mol equivalents, based on the polyol and subsequent reaction with at least one carboxylic acid of 6 to 30 carbon atoms. The polyol used is preferably a polyol from the group consisting of glycerol, trimethylolpropane, pentaerythritol, dipentaerythritol and polyols derived from mono- and polysaccharides, especially sorbitol and polyols with sorbitan core scaffold.

It is particularly preferable for the compounds of component b1) to be partially esterified sorbitan alkoxylates, the hydroxyl groups of which have been esterified with carboxylic acids having a chain length of 6 to 30 carbon atoms before or preferably after alkoxylation, in which case each hydroxyl group of the parent polyol may display a mutually independent number of alkoxy units and an average from 10 to 60 alkoxy units are present per sorbitan unit. The preferred esterified sorbitan alkoxylates comprise a random distribution of the alkoxy groups.

Partially esterified alkoxylated sorbitan derivatives are preferably prepared by reaction of a sorbitan of formula

where
X is a sorbitan radical, especially a 1,4-sorbitan radical, and m represents the number 4,
with
10 to 60 equivalents, per mole of sorbitan, preferably 10 to 40, more preferably 10 to 30 and most preferably 15 to 25 equivalents of identical or different $C_2$-$C_6$-alkylene oxides, especially $C_2$- and/or $C_3$-alkylene oxides, preferably ethylene oxide, and with
1 to 3, preferably 0.8 to 1.2 equivalents, based on the sorbitan, of an aliphatic, optionally unsaturated carboxylic acid, preferably having a chain length of 6 to 30 carbon atoms, which carboxylic acid is unsubstituted or substituted by hydroxyl groups and preferably is straight chain, in any desired order. Preferably, the reaction with the alkylene oxide is carried out before the reaction with the carboxylic acid.

Preference is given to sorbitan polyoxyethylene monoesters alkoxylated with 10-60 mol of ethylene oxide units per sorbitan unit and preferably having a 1,4-sorbitan core scaffold.

These preferably conform to the following structural formulae in which
R represents an optionally hydroxyl-substituted alkyl or alkenyl radical of the carboxylic acid and
m, n, p and q are each independently statistical values and in the range from 0 to 60,
with the proviso that the sum total of the number of oxyethylene units m+n+p+q is in the range from 10 to 60, preferably 18 to 22 and especially 20.

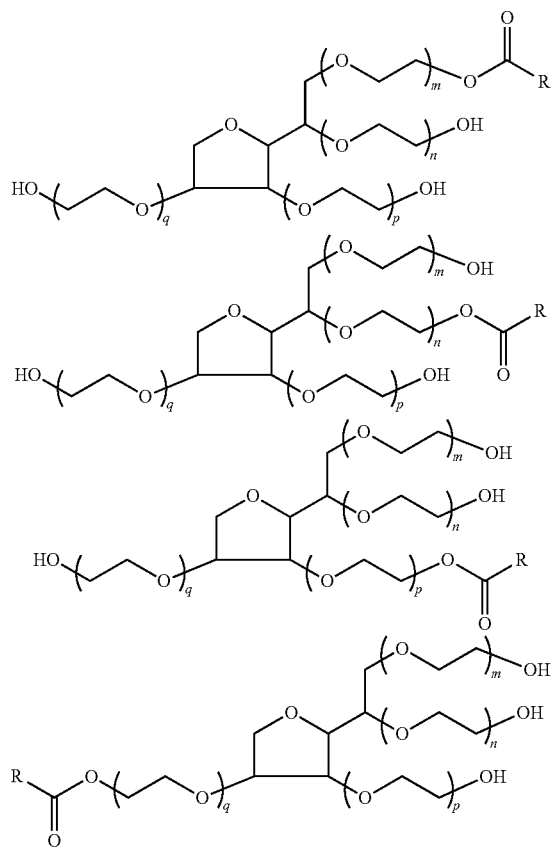

Corresponding alkoxylated sorbitan diesters and mixtures thereof are likewise suitable.

It is further possible to use alkoxylated sorbitan esters wherein one hydroxyl group of the sorbitan unit, especially in the above-indicated formulae is directly esterified with the carboxylic acid, i.e. where there is no alkylene oxide unit between the sorbitan unit and the carboxylic acid radical and the three non-acylated hydroxyl groups are etherified with a correspondingly higher number of alkylene oxide units. Such compounds are obtainable for example by first esterifying the sorbitan with a carboxylic acid and then alkoxylating the resulting product, consisting of a mixture of the isomeric monoesters which, in the case of an excess of carboxylic acid, can also contain mixtures of the isomeric diesters.

The alkylene oxide used to alkoxylate the sorbitan is preferably selected from the group consisting of ethylene oxide, propylene oxide and butylene oxide. It is also possible here for the sorbitan to be reacted with various alkylene oxides mentioned, for example ethylene oxide and propylene oxide, in which case sorbitan alkoxylates are obtainable that each include blocks of multiple units of an alkylene oxide, for example ethylene oxide, alongside blocks of multiple units of another alkylene oxide, for example propylene oxide. It is particularly preferable for the sorbitan alkoxylates to contain ethylene oxide (EO) units, preferably exclusively. In such a case, the alkylene oxide used is particularly preferably ethylene oxide.

It is further possible, when reacting a sorbitan with various of the alkylene oxides mentioned, for example ethylene oxide and propylene oxide, to obtain sorbitan alkoxylates in which the various alkylene oxides are incorporated randomly. The amounts used of alkylene oxide are preferably in the range from 10 to 60 mol of alkylene oxide per mol of sorbitan, more preferably in the range from 10 to 40 mmol, even more preferably in the range from 10 to 30 mol and most preferably in the range from 15 to 25 mol. Ethylene oxide is the totally preferred alkylene oxide.

The carboxylic acids suitable for esterifying the starter polyol and particularly the sorbitan alkoxylate are preferably saturated or unsaturated and linear or branched and can optionally be substituted by hydroxyl groups. The following carboxylic acids may be mentioned by way of example: hexanoic acid, heptanoic acid, optanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, octadecenoic acid (oleic acid), undecenoic acid. Particular preference is given to decanoic acid, undecanoic acid, dodecanoic acid (lauric acid), tetradecanoic acid, hexadecanoic acid (palmitic acid) and octadecanoic acid (stearic acid), ricinoleic acid. Very particular preference is given to dodecanoic acid (lauric acid), hexadecanoic acid (palmitic acid) and octadecanoic acid (stearic acid) and octadecenoic acid (oleic acid).

Compounds useful as component b1) include, for example, commercially available products, for example sorbitan polyoxyethylene (20) monolaurate (for example Polysorbat® 20 or Tween® 20 (Croda Oleochemicals) or Eumulgin® SML 20 (Cognis)), sorbitan polyoxyethylene (20) monopalmitate (for example Polysorbat 40 or Tween® 40 (Croda Oleochemicals)), sorbitan polyoxyethylene (20) monostearate (for example Polysorbat 60 or Tween® 60 (Croda Oleochemicals) or Eumulgin® SMS 20 (Cognis)), sorbitan polyoxyethylene (20) monooleate (for example Polysorbate 80 or Tween® 80 (Croda Oleochemicals)).

Further preferred compounds for component b1) are for example alkoxylates of mono- and polyglycerol esters. Such alkoxylated (poly)glycerol esters are prepared either by alkoxylation of glycerol or of a polyglycerol and subsequent esterification with a fatty acid, or by esterification of the glycerol or polyglycerol with a fatty acid and subsequent alkoxylation. Compositions according to the invention suitably utilize especially alkoxylates of mono- and polyglycerol esters which have an HLB value of at least 13 and preferably have a water solubility at 20° C. of more than 10 g per liter. It is further possible to use alkoxylated glycerol esters or polyglycerol esters which are esterified with more than one carboxylic acid. Alkoxylated monoglycerol monoesters are particularly preferred.

$C_2$ to $C_6$-Alkylene oxides are suitable for use in the alkoxylation, more preferably ethylene oxide. Preference is given to an alkoxylation with 10 to 100 alkylene oxide units, especially with 20 to 60 alkylene oxide units. The hydroxyl groups of the glycerol or polyglycerol each independently display on average a different number of alkylene oxide units.

As particularly suitable alkoxylates of mono- and polyglycerol esters there may be mentioned for example: glycerol monostearate ethoxylates having on average from 15 to 30 and especially on average 20 EO units, glycerol monooleate ethoxylates having 20 to 40 EO units, diglycerol monostearate having 20 to 40 EO units, polyglycerol monostearate having 20 to 40 EO units, castor oil alkoxylates and hydrogenated castor oil alkoxylates, in short: (hydrogenated) castor oil alkoxylates. The latter are products which are obtainable by alkoxylation of castor oil or hydrogenated castor oil with alkylene oxides, especially ethylene oxide and propylene oxide, and preference is given to those which include from 20 to 100 alkylene oxide units per (hydrogenated) castor oil unit and preferably from 20 to 60 ethylene oxide units per (hydrogenated) castor oil unit.

Corresponding glycerol-based compounds of components b1) are likewise available as commercial products, for example glycerol monostearate ethoxylate having on average 20 EO units as Cutina® E 24 (Cognis), hydrogenated castor oil ethoxylate having on average 40 EO units as Eumulgin® HRE 40 (Cognis).

Component b2)

Preferred compounds for component b2) are for example alkyl monoglycosides, alkyldiglycosides, alkyltriglycosides and higher homologues, here generally referred to as alkylglycosides, especially monoglucosides, diglucosides, triglucosides, or higher homologues and mixtures thereof, the hydroxyl groups of which are partially substituted with $C_6$-$C_{18}$-alkyl groups. Preference is given to mixtures of mono-, di- and triglucosides and higher homologues with $C_6$-$C_{18}$-alkyl groups, and a degree of polymerization (DP) of 1 to 5. Particular preference is given to alkylglucosides whose alkyl groups have a chain length of 6 to 18 carbon atoms and especially 6 to 12 carbon atoms. Preference is further given to alkylglucosides whose alkyl groups have a chain length distribution or constitute mixtures of alkylglucosides having different alkyl chains.

Alkylglycosides are preferably substances which consist of a single ring of a sugar or of a chain of rings of a sugar which are interlinked by glycosidic bonds, wherein the last ring of the glycosidic chain is acetalizated with an alcohol. Alkylglycosides have the following general formula:

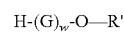

where

G represents a glycosidic unit,

R' represents the alkyl radical of an alcohol used for forming glycosidic acetal, and w represents the average degree of polymerization, i.e. the number of linked glycosidic units, and a number from 1 to 5.

In suitable alkylglycosides, w represents a number from 1 to 5 and R represents the radical of a linear or branched aliphatic alcohol having 6 to 30 carbon atoms. These products are known per se and commercially available. The value of w can be influenced in the course of the synthesis by appropriately adjusting the molar ratio of alcohol to saccharide. Increasing this ratio gives alkylglycosides having a lower average value of w. Conversely, a higher degree of polymerization is achieved via a low molar ratio of alcohol to saccharide.

An example is the structure of an alkylglucoside where R' represents an alkyl radical and v assumes values from 1 to 4:

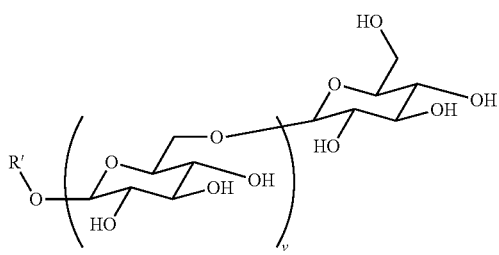

The compounds are generally present in the form of isomeric mixtures. Especially the anomeric carbon atoms (glycosidic carbon atoms) will be present as mixtures of the stereoisomers.

The preferred alkylpolyglucosides constitute mixtures of alkylmonoglucoside, alkyldiglucoside and alkyltriglucoside with or without alkyloligoglucoside which will vary with the molar ratio of the starting materials and as a function of the process conditions and which possibly still contain (poly) glucoses and small fractions of the free alcohol R'OH.

Alkylpolyglucosides are obtainable for example via a direct synthesis proceeding from a sugar with an excess of one or more alcohols. An alternative method of synthesis proceeds from starch which, in an initial step, is reacted with lower alcohols (e.g. methanol, ethanol, butanol) in the presence of an acid catalyst to form an alkylglucoside having a short-chain glycosidic group (e.g. methyl, ethyl, butyl). This intermediate is reacted in a subsequent step with the long-chain alcohol under vacuum in the presence of an acid as catalyst by a transacetalization in which the equilibrium is shifted by distilling off the lower alcohol. The preparation of alkylglucosides is described for example in WO90/001489. U.S. Pat. No. 5,576,425, DE 69824366 or a paper by M. Biermann (Henkel KGaA), K. Schmid, P. Schulz in Starch-Stärke, vol. 45(8), p. 281-288 (1993).

Particularly preferred alkylglucosides include especially hexylglucoside, octylglucoside, decylglucoside, undecylglucoside, and dodecylglucoside and also their homologues and also the mixture of alkylmonoglucoside, alkyldiglucoside, alkyltriglucoside with or without alkylpolyglucoside and mixtures thereof.

Alkylglycosides where the sugar residue is constructed from various sugar units are also suitable. But particular preference is given to alkylglycosides constructed exclusively of glucose units.

The compounds of component b2) are commercially available in that, for example, a $C_8$-$C_{10}$-alkylpolyglucoside having a degree of polymerization (DP=degree of polymerization) of 1.6 is available under the trade name Glucopon® 215 CS UP (Cognis). A $C_{12}$-$C_{16}$-alkylpolyglucoside having a DP of 1.4 is available under the trade name Glucopon® 600 CS UP (Cognis) for example.

Further Added Substances

The aqueous composition may additionally contain further added substances, preferably carboxylic acid of component c) or salts thereof.

Component c)

Suitable compounds for component c) are especially mono- or polycarboxylic acids, preferably hydroxy polycarboxylic acids. Suitable examples include: formic acid, acetic acid, oxalic acid, glyoxylic acid, malonic acid, lactic acid, tartaric acid, maleic acid, glutaric acid, phthalic acid, adipic acid, malic acid, citric acid, or polycarboxylic acids such as (co)polymers of (meth)acrylic acid, maleic acid, crotonic acid or itaconic acid or derivatives thereof with optionally further monomers such as ethene, propene, styrene, hydroxyethyl methacrylate, hydroxypropyl methacrylate, hydroxyethyl acrylate, hydroxypropyl acrylate, 4-hydroxybutyl vinyl ethers, especially those having an average molar mass (weight average Mw) of 500 to 100 000 g/mol, especially 500 to 30 000 g/mol. Particularly preferred carboxylic acids for component c) are citric acid, tartaric acid and lactic acid.

The aqueous composition may additionally contain further added substances, in which case the amount of these added substances including that of component c) is preferably up to 30% by weight.

The weight ratio of component a) to b) is preferably in the range from 1:1 to 500:1, especially 5:1 to 400:1.

Substances from the groups of synthetic tanning agents such as resin tanning agents, polymeric retanning agents, and vegetable tanning agents, fatliquoring agents and buffers and/or fillers can preferably be added as preferred further added substances in order to simplify the tanning operation and enhance the quality of the leather.

The synthetic tanning agents suitable for this use are, for example, water-soluble condensation products formed from sulphonated aromatics, formaldehyde or glutaraldehyde and optionally further substances from the groups of aromatics, urea, or urea derivatives. Preference here is given to products based on the condensation of naphthalenesulphonic acids, ditolyl ether sulphonic acids, phenolsulphonic acids, dihydroxydiphenyl sulphone and phenol and also combinations of these raw materials with formaldehyde and glutaraldehyde and optionally urea or urea derivatives.

Similarly suitable synthetic tanning agents are polycondensates based on dihydroxydiphenyl-sulphone/naphthalenesulphonic acid and formaldehyde, dihydroxydiphenyl sulphone/ditolyl ether sulphonic acid and formaldehyde, dihydroxydiphenyl sulphone/phenolsulphonic acid/ditolyl ether sulphonic acid/urea and formaldehyde (commercially available tanning agents such as, for example, TANIGAN® BN, TANIGAN® PR, TANIGAN® 3LN, TANIGAN® HO, TANIGAN® UW from Lanxess or mixtures thereof).

Vegetable tanning agents are tanning agents obtained from vegetable sources and belonging to the classes of condensed tanning agents or hydrolysable tanning agents e.g. chestnut extract, mimosa, tara or quebracho. Vegetable tanning agents also include those obtainable from vegetable sources such as algae, fruit, e.g. rhubarb, olives, plant parts such as leaves, tree bark, roots, woods optionally after a chemical/enzymatic modification and/or by extractive methods.

The polymeric retanning agents preferred for use are high molecular weight water-soluble or water-dispersible products e.g. from the (co)polymerization reaction of unsaturated acids and derivatives thereof with, for example, filling or fatliquoring action on leather. Preference is given to (co) polymerization products of acrylic and methacrylic acids and also esters thereof.

Resin tanning agents likewise come into consideration as synthetic tanning agents, and are preferably polycondensates based on melamine, dicyandiamide, urea or mixtures thereof with formaldehyde or glutaraldehyde.

In a further preferred embodiment, the buffered or unbuffered compositions according to the invention contain from 5 to 30 wt %, preferably 10 to 25 wt % of synthetic tanning agents.

Fatliquoring agents are preferably substances based on biological, mineral or synthetic oils which, to improve their utility in water, can be provided with hydrophilic groups, for example via complete or partial sulphatization, sulphitization, carboxylation or phosphatization.

Possible fillers are preferably inert inorganic salts and also organic polymers, for example sulphates such as sodium sulphate or calcium sulphate, talc, silicon oxide compounds, starch or ligninsulphonates.

The aqueous compositions according to the invention preferably have a pH in the range from 1 to 5 and preferably in the range from 2.0 to 3.5.

To set this pH, it is advantageous for the composition to be adjusted and stabilized to the suitable pH range, especially a pH range from 1 to 5, preferably 2.0 to 3.5, by addition of a sufficient amount of a buffering substance. Useful organic buffers for this are preferably mixtures of compounds of component c) and salts thereof, Preferred salts are especially alkali metal salts, preferably sodium or potassium salts.

The aqueous compositions may be present as a solution or suspension for example. A solution is preferred.

Preferably, the composition according to the invention contains 5 to 50 wt %, especially 10 to 40 wt % of the component a) compound containing carbamoylsulphonate groups and
0.05 to 5 wt %, especially 0.1 to 2 wt % of the component b) all based on the composition.

It is likewise preferable for the composition to additionally contain from 1 to 20 wt %, especially 1 to 10 wt % and most preferably 1 to 5% of component c), preferably citric acid, all based on the composition.

The composition preferably contains, as a consequence of its method of making, from 0.01 to 5 wt %, preferably 0.1 to 2 wt %, based on the composition, of a reaction product of hydroxy-polycarboxylic acid and the polyisocyanate used.

The dry residue of the aqueous composition, i.e. the overall concentration of the ingredients of the aqueous composition, is preferably from 25 to 50%. Especially an overall concentration of 30 to 40% is advantageous for the aqueous composition, while the proportion of component a) in the composition is particularly advantageously in the range from 28 to 35%.

When further added substances are used, it is preferable for the proportion of components a) to c) to decrease in appropriate proportion to the proportions of the further added component, so that the overall concentration of solids in the aqueous solution is preferably not more than 50%.

In one particular embodiment, the aqueous preparations according to the invention also contain reaction products of polyisocyanates or polyisocyanate-bisulphite adducts and the partially esterified polyol alkoxylates (component b), which reaction products contain urethane groups and have carbamoylsulphonate end groups. Such reaction products are also obtainable for example by reaction of an excess of polyisocyanate with component b), and advantageously useful as added substance.

In a likewise particular embodiment, the aqueous preparations according to the invention also contain reaction products of polyisocyanates and polyisocyanate-bisulphite adducts and citric acid. Such reaction products, which contain urethane groups and carbamoylsulphonate groups, are obtainable, for example, excess of by reaction of an polyisocyanate with component c) and subsequent reaction with a bisulphite and/or disulphite. Compounds of this type are for example bisurethanes formed from 1 mol of hexamethylene diisocyanate and 2 mol of citric acid or, for example, the monourethane formed from 1 mol of hexamethylene diisocyanate and 1 mol of citric acid, while remaining NCO groups react in situ with bisulphite and/or disulphite to form the carbamoylsulphonate group.

Particularly preferred compositions are those containing compounds containing carbamoylsulphonate groups and obtained by reaction of at least one organic isocyanate with at least one bisulphite and/or disulphite and at least one hydroxy-polycarboxylic acid (component c), especially citric acid, preferably in an amount of 0.05 to 3, preferably 0.1 to 2 wt %, based on the composition, in the presence of a compound of component b1).

Surprisingly, the compositions according to the invention exhibit improved resistance in storage and no phase separation even at elevated temperature.

Producing the Composition

The invention further provides a process for producing the aqueous composition, said process being characterized in that components a) and b) are mixed in water with or without further added substances.

The compound of component a) is also obtainable for example by reacting at least one organic polyisocyanate with at least one bisulphite and/or disulphite in an organic or aqueous-organic solvent such as water-dioxane for example similarly to the procedure of DE102006056479-A1.

The invention further provides a process for producing the aqueous composition according to the invention, said process being characterized in that at least one organic polyisocyanate is reacted with at least one bisulphite and/or disulphite in the presence of water and component b) and optionally component c) and optionally admixed with further added substances.

It is particularly preferable with this alternative process according to the invention that the preparation of component a) is effected by reacting at least one organic polyisocyanate with at least one alkali metal or ammonium bisulphite and/or disulphite in water in the presence of component b), especially component b1).

It is very particularly preferable with this alternative process according to the invention that the preparation of component a) is effected by reacting at least one organic polyisocyanate with at least one alkali metal or ammonium bisulphite and/or disulphite in water in the presence of component b), especially component b1) and in the presence of component c).

Reaction times of 1 to 12 and preferably 1 to 6 hours are generally sufficient for this, depending on the organic polyisocyanate used and the reaction temperature. The reaction preferably takes place at a temperature of 0 to 100° C., preferably at 10 to 80° C. and more preferably at 10 to 60° C. It is particularly preferable to use alkali metal bisulphites or alkali metal disulphites.

The organic polyisocyanates are reacted with alkali metal or ammonium bisulphite and/or disulphite in water preferably at 0 to 100° C., more preferably at 10 to 80° C. and even more preferably at 10 to 60° C. in the presence of at least one compound of component b1) until all NCO groups have reacted.

Again, reaction times of 1 to 12 and preferably 1 to 6 hours are generally sufficient for this purpose, depending on the organic polyisocyanate used and the reaction temperature.

Especially 0.05 to 5, preferably 0.1 to 2% of component b), based on the composition, is used before or during the addition of the polyisocyanate.

It is likewise preferable to perform the reaction in the presence of carboxylic acids, especially hydroxy-polycarboxylic acids of component c), especially aliphatic dicarboxylic acids and most preferably hydroxy polycarboxylic acids, especially citric acid, tartaric acid or lactic acid.

Especially 0.05 to 3, preferably 0.1 to 2% of component c), based on the composition, is used even during the reaction of the polyisocyanate with the bisulphite/disulphite.

It is particularly preferable to add a hydroxy-polycarboxylic acid of component c) even before or during the synthesis of component a). Preferably, 10% of the entire amount of component c) is added even before or during the reaction of the polyisocyanate with the bisulphite/disulphite.

Surprisingly, the method is useful to obtain carbamoylsulphonates in particular purity. The preferred aqueous compositions thus contain less than 2% of dimeric, trimeric or polymeric carbamoylsulphonates which contain urea groups and which may be by-produced by hydrolysis of the polyisocyanates in the course of the synthesis.

The use of a hydroxy-polycarboxylic acid, especially citric acid, during the synthesis is also very advantageous from a technical point of view. The rate of the exothermic reaction with the bisulphite is surprisingly easy to influence in this way, and offers an additional advantage and an increased measure of safety in the reaction conduct.

In one particular embodiment, the aqueous preparations according to the invention also contain reaction products of polyisocyanates or polyisocyanate-bisulphite adducts and citric acid. Such reaction products, which contain urethane groups with or without carbamoylsulphonate groups, are also obtainable for example by reaction of an excess of polyisocyanate with component c). Compounds of this type are for example bisurethanes formed from 1 mol of hexamethylene diisocyanate and 2 mol of citric acid or for example the monourethane formed from 1 mol of hexamethylene diisocyanate and 1 mol of citric acid, while remaining NCO groups react with bisulphite and/or disulphite to form the carbamoylsulphonate group.

The invention further provides compounds containing carbamoylsulphonate groups, these compounds being obtained by reaction of at least one organic isocyanate with at least one bisulphite and/or disulphite and at least one carboxylic acid, especially hydroxy-polycarboxylic acid, especially citric acid, preferably in the presence of a nonionic alkoxylated polyol containing ester groups and having an HLB of at least 13 (b1) and/or an alkyl glycoside (b2).

The invention likewise provides a process for preparing the still novel compounds containing carbamoylsulphonate groups, which is characterized in that at least one organic isocyanate is reacted with at least one bisulphite and/or disulphite in an aqueous medium in the presence of a nonionic alkoxylated polyol containing ester groups and having an HLB of at least 13 (b1) and/or an alkyl glycoside (b2) and in the presence of a carboxylic acid, especially hydroxy-polycarboxylic acid, especially citric acid.

The end products are generally optically clear, aqueous solutions, in some individual cases also stable, finely divided emulsions or else suspensions having average particle diameters below 8000 nanometers, preferably dispersions below 200 nanometers. Particular preference is given to end products generated as optically clear aqueous solutions or hydrosols. Optically clear compositions are obtained from water-soluble components a), b) and c) provided the further added substances are likewise soluble in water.

Especially 0.1 to 50, preferably 0.5 to 20 wt % of the compound of component b), based on the total amount of polyisocyanate used, is used for synthesis. The emulsifying power of components b) varies with the polyisocyanates used. Generally, however, it is preferable to use as little as possible of component b). It is therefore preferable to use an amount of 0.1 to 10 wt % of component b) based on the polyisocyanate used to emulsify the polyisocyanate.

Use

The invention further provides for the use of the compositions according to the invention as pretanning or tanning agents for hides and skins.

A pretanning agent for the purposes of this invention is a product whereby a hide or skin can be converted into a state which permits commercial mechanical treatments such as samming or shaving, but requires further treatment steps with tanning substances for finalizing the leather or fur.

The invention further provides a process for tanning hides and skins, which is characterized in that hides or skins pretreated by washing, liming, optionally unhairing and deliming are treated with the composition according to the invention.

It will be appreciated that unhairing is omitted for the tanning of skins.

The appropriately pretreated hides (called pelts hereinafter) are preferably treated in a commercially available drum in aqueous float at a temperature of 10° C. to 60° C. and a pH of 5 to 10, preferably 7 to 9 with 0.5 to 10%, preferably 1 to 4%, (based on the proportion of pure component a), of the composition according to the invention such that a tanned intermediate product having a shrinkage temperature of at least 65° C., preferably at least 68° C. and more preferably at least 70° C. is obtained. The shrinkage temperature is determined by methods known to a person skilled in the art, for example by heating the tanned intermediate product by immersion in a water bath whose temperature is raised at a certain heating rate until the material is observed to contract. The temperature reached at the point of contraction is read off on the display of the leather shrinkage tester. The shrinkage temperature can also be determined using the differential scanning calorimetry (DSC) method known to a person skilled in the art.

Preferably, after addition of the composition according to the invention, the product is allowed to penetrate for preferably 0.1 to 8 h, more preferably 0.2 to 2 h at a pH in the section of the pelt from 8 to 10 and a float pH of 7 to 8, and then a fixing agent is added. Useful fixing agents include any bases known per se in tanning, or mixtures thereof, examples being aqueous sodium hydroxide solution, alkali metal carbonates, alkali metal bicarbonates, magnesium oxide, dolomite, tertiary amines and so on, but preferably dolomite, magnesium oxide, sodium carbonate and aqueous sodium hydroxide solution. Fixing preferably takes from 2 to 24 h, preferably 4 to 12 h at a float pH of 7 to 10, preferably a float pH of 7.0 to 8.5.

It is also possible to interrupt tannage by acidifying to pH 4 to 6 or addition of ammonia or of a primary or secondary amino compound. This is especially advantageous when excessive adstringency of the float is to be avoided and a partial deactivation of the tanning agent is desired. These additional measures are suitable for influencing the tanning operation in an advantageous manner.

It is particularly advantageous to choose a low initial float pH of 6 to 7 to penetrate the tanning agent and to manage the fixing in the pH range between 7.5 and 8.5 and by raising the temperature.

The tanned intermediate products obtained are useful for mechanical further processing by, for example, samming, shaving or splitting. In addition, these intermediate products are distinguished by a remarkably white, clear and lightfast self-colour, and this is a distinct advantage over leathers tanned with glutaraldehyde. The intermediate products can be retanned using commercial processes to provide soft and airy crust leathers.

The invention further provides a process for producing leather and furs, characterized in that prepared pelt material (i.e. skins conditioned for tannage or delimed and/or pickled pelt material) is treated in aqueous float at a temperature of 10° C. to 60° C. and a pH of 5 to 10, preferably 7 to 9 with 0.5 to 10%, preferably 1 to 4% (based on active content of component a)) of the composition according to the invention until a tanned intermediate product having a shrinkage temperature of at least 65° C., preferably at least 68° C. and more preferably at least 70° C. is obtained.

When the shrinkage temperature is lower, the mechanical manipulation of the tanned intermediate products, i.e. the wet white material, on, for example shaving machines is problematical, since the wet white material sticks excessively to the blade rolls and is difficult to process. If, by contrast, tannage is allowed to proceed for longer, more tanning agent is added or fixation at higher pH values is carried out, significantly higher shrinkage temperatures can be achieved. However, these are not required for the mechanical manipulation of the pelts.

In a special embodiment of the invention, the properties concerning mechanical further processing and also the final leather properties can be adapted to customer requirements by the addition of the composition according to the invention being preceded, accompanied or followed by the addition to the tanning float of further substances typical in tannage.

They include conventional, commercially available synthetic organic tanning agents, resin tanning agents, filling and softening polymeric tanning agents, fatliquors and hydrophobisizing agents. These agents are preferably added in the following retanning steps in the amounts customary for wet white.

The tanning operation according to the invention is advantageous in that leathers having a broad spectrum of properties are obtainable and that the shavings generated in the course of mechanical manipulation can be widely used as raw materials, including for making useful products for application in the leathermaking operation. This makes a significant contribution to further reduce waste in leather production.

EXAMPLES

Comparative Example 1

EP-A 0 690 135, Example 5 10.7% of Emulsifier Based on HDI

Under nitrogen, 15.75 g (0.007 mol) of an n-butanol-initiated ethylene oxide-propylene oxide polyether having a molecular weight of 2250 g/mol and an ethylene oxide group content of 85%, which was dewatered in vacuo at 110° C., are mixed at room temperature under nitrogen with 147.3 g (0.877 mol) of hexamethylene diisocyanate and heated to 100° C. The temperature is maintained for 3 hours and subsequently the NCO content is determined (calculated 45.0%. found 44.7%).

After cooling to room temperature, 507.2 g (1.900 mol) of a 39% sodium bisulphite solution in water were added and subsequently stirred in for 0.5 hours during which the temperature rose to about 45° C. Then, 231.9 g of deionized water were added to adjust the solids content to 40%. The mixture is subsequently stirred at room temperature for 16 hours. A small amount of a white solid is filtered off to obtain a clear, colourless 40% strength solution of pH 4.8.

Storage at 40° C./4 weeks: precipitate, pH 7.10.
Efficacy after thermal treatment: about 30%

Comparative Example 2

EP 1647563, Example A24 15% of Emulsifier Based on HDI

To a solution of 150 g of a branched $C_{1-3}$-alcohol ethoxylate with 10 mol of EO in 5100 g of sodium bisulphite solution (26.5%) are added 1000 g of hexamethylene diisocyanate over 30 minutes at room temperature under agitation, the temperature of the reaction mixture rising to about 45° C. The mixture is subsequently stirred at 20° C. for 6 hours. Then, 37.5 g of citric acid monohydrate are added and the slightly cloudy solution is finally filtered to obtain a clear 40% strength solution of pH 3.6.

Storage at 40° C./4 weeks: precipitate, 2 liquid phases form, severe foaming on shaking, pH 6.75.
Storage at 20° C./4 weeks: clear homogeneous solution, pH 4.30
Efficacy after thermal treatment: about 50%

A) Producing Inventive Compositions

Example A1

7.1% of Component b) Based on HDI

To a solution of 21 g of sorbitan polyethylene glycol (20) monododecanoate (e.g. Eumulgin® SML 20 (Cognis) or Tween® 20 (Croda)), which is alkoxylated with altogether 20 ethylene oxide units per sorbitan unit (HLB 16.7), in 1334 g of water and 351.6 g of sodium metabisulphite ($Na_2S_2O_5$) are added at 23° C. 296.4 g of hexamethylene diisocyanate in one portion under agitation. The temperature of the reaction mixture is then raised to 50° C. during 30 minutes. At this point, the mixture has reached a pH of 5.53.

The mixture is subsequently stirred at 50° C. for 1 hour during which the pH rises to 6.51 during the first 30 minutes and then remains constant. The reaction mixture is almost clear and is cooled down to 20° C. during 2 hours. It is subsequently stirred at room temperature (20-23° C.) for 2 hours. The pH of the solution is 6.39.

The batch is then divided:
1) 961.4 g of product are admixed with 8.1 g of citric acid monohydrate (0.8%).
Filtration gives a clear solution of 34.8% solids content and pH 3.60.
Storage at 40° C./4 weeks: solution no longer entirely clear, pH 6.42
Storage at 20° C./4 weeks: clear homogeneous solution, pH 3.80
Efficacy after thermal treatment at 40° C./4 weeks: 80%
2) 1024.9 g of product are admixed with 25.4 g of citric acid monohydrate (2.4%).
Filtration gives a clear solution of 36.1% solids content and pH 2.96.
Storage at 40° C./4 weeks: clear homogeneous solution, pH 3.31
(clear solution, no $CO_2$ evolution)
Storage at 20° C./4 weeks: clear homogeneous solution, pH 3.00
Efficacy after thermal treatment at 40° C./4 weeks: 100%

Example A2

7.1% of Component b) Based on HDI

A solution of 2668 g of water and 703.2 g of sodium metabisulphite ($Na_2S_2O_5$) was used to dissolve 42.0 g of sorbitan polyethylene glycol (20) monododecanoate (e.g. Eumulgin® SML 20 (Cognis) or Tween® 20 (Croda)), which is alkoxylated with altogether 20 ethylene oxide units per sorbitan unit (HLB 16.7). At 22° C., 592.8 g of hexamethylene diisocyanate were added in one portion under agitation. The temperature of the reaction mixture was then raised to 50° C. during 40 minutes. At this point, the mixture has reached a pH of 5.72.

This is followed by the addition of 33.6 g of citric acid monohydrate dissolved in 100 g of water, resulting in a pH of 3.72.

The mixture is subsequently stirred at 50° C. for 1 hour during which the pH rises to 4.66 during the first 30 minutes and then remains constant. The reaction mixture is already clear and is cooled down to 20° C. during 2 hours. It is subsequently stirred at room temperature (20-23° C.) for 2 hours. The pH of the solution is 4.67. This is followed by the addition of 100.8 g of citric acid monohydrate in solid form and adjustment of the concentration with water.

A clear 35% strength solution of pH 3.11 is obtained.

Storage at 40° C./4 weeks: clear homogeneous solution, pH 3.70

Storage at 20° C./4 weeks: clear homogeneous solution, pH 3.00.

Efficacy after thermal treatment at 40° C./4 weeks: 100%

Example A3

6.1% of Component b) Based on HDI

To a solution of 15.7 g of sorbitan polyethylene glycol (20) monododecanoate (e.g. Eumulgin® SML 20 (Cognis) or Tween® 20 (Croda)), which is alkoxylated with altogether 20 ethylene oxide units per sorbitan unit (HLB 16.7), in 573.1 g of water and 646.4 g of sodium bisulphite solution (NaHSO$_3$, 38-40% in water) are added at 20° C. 256.4 g of isophorone diisocyanate during 5 minutes under agitation. The temperature of the reaction mixture is then raised to 50° C. during 90 minutes. At this point, the mixture has reached a pH of 5.90.

The mixture is subsequently stirred at 50° C. for 1.5 hours during which the reaction mixture clarifies after 45 minutes. It is then cooled down to 23° C. during 1.5 hours. It is subsequently stirred at room temperature (20-23° C.) for 4 hours. The pH of the solution is 5.65. This is followed by the addition of 20.4 g of citric acid monohydrate dissolved in 20.4 g of water and adjustment of the concentration with 18.7 g of water to obtain a clear 35% strength solution of pH 2.80.

Storage at 40° C./4 weeks: clear homogeneous solution, pH 2.95

Storage at 20° C./4 weeks: clear homogeneous solution, pH 2.80

Efficacy after thermal treatment at 40° C./4 weeks: 100%

Example A4

7.1% of Component b) Based on HDI

To a solution of 97.9 g of sorbitan polyethylene glycol (20) monododecanoate (e.g. Eumulgin SML 20 (Cognis) or Tween® 20 (Croda)), which is alkoxylated with altogether 20 ethylene oxide units per sorbitan unit (HLB 16.7), in 3265.3 g of water and 4617.2 g of sodium bisulphite solution (NaHSO$_3$, 38-40% in water) are added at 20° C. 1385.6 g of hexamethylene diisocyanate during 5 minutes under agitation. The temperature of the reaction mixture is then raised to 50° C. during 30 minutes. 78.1 g of citric acid monohydrate dissolved in 64.7 g of water are then added.

The mixture is subsequently stirred at 50° C. for 1 hour during which the reaction mixture clarifies. It is then cooled down to 23° C. during 2 hours. It is subsequently stirred at room temperature (20-23° C.) for 1 hour. The pH of the solution is 3.84. This is followed by the addition of 235.7 g of citric acid monohydrate dissolved in 195.2 g of water and adjustment of the concentration by addition of 264.2 g of water to obtain a clear 35.2% strength solution of pH 2.68.

Storage at 40° C./4 weeks: clear homogeneous solution, pH 3.33.

Storage at 20° C./4 weeks: clear homogeneous solution, pH 2.70.

Efficacy after thermal treatment at 40° C./4 weeks: 100%

Example A5

7.1% of Component b) Based on HDI

To a solution of 10.5 g of sorbitan polyethylene glycol (20) monododecanoate (e.g. Eumulgin SML 20 (Cognis) or Tween 20 (Croda)) which is alkoxylated with altogether 20 ethylene oxide units per sorbitan unit (HLB 16.7), in 550.0 g of water and 184.2 g of sodium metabisulphite (Na$_2$S$_2$O$_5$) are added 1.2 g of citric acid monohydrate. Then, 148.2 g of hexamethylene diisocyanate are added at 23° C. in one portion under agitation. This is immediately followed by the metered addition of a solution of 58.3 g of citric acid monohydrate dissolved in 99.2 g of water to obtain a pH between 3.0 and 4.0. Directly following the isocyanate addition, the temperature of the reaction mixture is at the same time raised to 50° C. during 50 minutes. This is followed by stirring at 50° C. for 1 hour. The reaction mixture becomes clear and has a pH of 3.55. Finally, 169.0 g of water are added to obtain a clear 33.7% strength solution of pH 3.24.

Storage at 40° C./4 weeks: clear homogeneous solution, pH 3.40.

Storage at 20° C./4 weeks: clear homogeneous solution, pH 3.20.

Efficacy after thermal treatment at 40° C./4 weeks: about 90%

Example A6

7.14% of Component b) Based on HDI

To a solution of 9.9 g of sorbitan polyethylene glycol (20) monooleate (e.g. Tween 80, Croda), which is alkoxylated with altogether 20 ethylene oxide units per sorbitan unit (HLB 15.0), in 326.5 g of water and 461.7 g of sodium bisulphite solution (NaHSO$_3$, 38-40% in water) are added at 24° C. 138.6 g of hexamethylene diisocyanate in one portion under agitation. The temperature of the reaction mixture is then raised to 50° C. during 30 minutes. At this point, the mixture has reached a pH of 5.23.

This is followed by the addition of 7.8 g of citric acid monohydrate dissolved in 7.8 g of water resulting in a pH of 3.45. The reaction mixture is subsequently stirred at 50° C. for 1 hour during which the pH rises to 4.28 during the first 30 minutes and then remains constant. The reaction mixture is clear and is cooled down to 20° C. during 2 hours. It is subsequently stirred at room temperature (20-23° C.) for 2 hours. The pH of the solution is 4.14. This is followed by the addition of 23.6 g of citric acid monohydrate dissolved in 23.6 g of water and adjustment of the concentration with 20.0 g of water to obtain a clear 35% strength solution of pH 3.05.

Storage at 40° C./4 weeks: clear homogeneous solution, pH 3.59

Storage at 20° C./4 weeks: clear homogeneous solution, pH 2.82.

Efficacy after thermal treatment at 40'C/4 weeks: 100%

Example A7

7.14% of Component b) Based on HDI

To a solution of 9.9 g of sorbitan polyethylene glycol (20) monohexadecanoate (e.g. Tween 40, Croda), which is alkoxylated with altogether 20 ethylene oxide units per sorbitan unit (HLB 15.6), in 326.5 g of water and 461.7 g of sodium bisulphite solution ($NaHSO_3$, 38-40% in water) are added at 21° C. 138.6 g of hexamethylene diisocyanate in one portion under agitation. The temperature of the reaction mixture is then raised to 50° C. during 40 minutes. At this point, the mixture has reached a pH of 5.51.

This is followed by the addition of 7.8 g of citric acid monohydrate dissolved in 7.8 g of water resulting in a pH of 3.56.

The reaction mixture is subsequently stirred at 50° C. for 1 hour during which the pH rises to 4.35 during the first 30 minutes and then remains constant. The reaction mixture is already clear and is cooled down to 20° C. during 2 hours. It is subsequently stirred at room temperature (20-23° C.) for 2 hours. The pH of the solution is 4.25. This is followed by the addition of 23.6 g of citric acid monohydrate dissolved in 23.6 g of water and adjustment of the concentration with 20.0 g of water to obtain a clear 34.9% strength solution of pH 2.58.

Storage at 40° C./4 weeks: clear homogeneous solution, pH 3.56

Storage at 20° C./4 weeks: clear homogeneous solution, pH 2.71.

Efficacy after thermal treatment at 40° C./4 weeks: 100%

Example A8

6.18% of Component b) Based on CHMDI

To a solution of 9.9 g of sorbitan polyethylene glycol (20) monododecanoate (e.g. Eumulgin SML 20 (Cognis) or Tween 20 (Croda)), which is alkoxylated with altogether 20 ethylene oxide units per sorbitan unit (HLB 16.7), in 326.5 g of water and 461.7 g of sodium bisulphite solution ($NaHSO_3$, 38-40% in water) are added at 20° C. 160.1 g of 1,3-bis (isocyanatomethyl)cyclohexane (Aldrich) under agitation. The temperature of the reaction mixture is then raised to 50° C. during 30 minutes. At this point, the mixture has reached a pH of 3.97.

This is followed by the addition of 7.8 g of citric acid monohydrate dissolved in 7.8 g of water resulting in a pH of 3.23. The reaction mixture is subsequently stirred at 50° C. for 1.75 hours during which the pH rises to 4.29 during the first 60 minutes and then remains constant. The reaction mixture is then clear and is cooled down to 20° C. during 2 hours. It is subsequently stirred at room temperature (20-23° C.) for 2 hours. The pH of the solution is 4.07. This is followed by the addition of 23.6 g of citric acid monohydrate dissolved in 23.6 g of water and adjustment of the concentration with 61.2 g of water to obtain a clear 35.0% strength solution of pH 2.60.

Storage at 40° C./4 weeks: clear homogeneous solution, pH 2.90.

Storage at 20° C./4 weeks: clear homogeneous solution, pH 2.65.

Efficacy after thermal treatment at 40° C./4 weeks: 100%

Example A9

7.07% of Component b) Based on HDI

To a solution of 9.8 g of sorbitan polyethylene glycol (20) monooctadecanoate (e.g. Eumulgin SML 20 (Cognis) or Tween 60 (Croda)), which is alkoxylated with altogether 20 ethylene oxide units per sorbitan unit (HLB 14.9), in 326.5 g of water and 461.7 g of sodium bisulphite solution ($NaHSO_3$, 38-40% in water) are added at 24° C. 138.6 g of hexamethylene diisocyanate under agitation. The temperature of the reaction mixture is then raised to 50° C. during 28 minutes. At this point, the mixture has reached a pH of 5.28.

This is followed by the addition of 7.8 g of citric acid monohydrate dissolved in 6.5 g of water resulting in a pH of 3.11. The reaction mixture is subsequently stirred at 50° C. for 1 hour during which the pH rises to 3.22 during the first 30 minutes and then remains constant. The reaction mixture is almost clear and is cooled down to 20° C. during 2 hours. It is subsequently stirred at room temperature (20-23° C.) for 2 hours. The pH of the solution is 2.80. This is followed by the addition of 23.6 g of citric acid monohydrate dissolved in 23.6 g of water and adjustment of the concentration with 20.0 g of water to obtain a slightly cloudy 34.9% strength solution of pH 2.38.

Storage at 40° C./4 weeks: clear homogeneous solution, pH 3.10.

Storage at 20° C./4 weeks: slightly cloudy homogeneous solution, pH 2.50.

Efficacy after thermal treatment at 40° C./4 weeks: 100%

Example A10

7.12% of Component b) Based on HDI

To a solution of 15.8 g of C8-C10 alkylglucoside (DP 1.6) (62.5% in water) (e.g. Glucopon 215 UP, Cognis), in 320 g of water and 461.7 g of sodium bisulphite solution ($NaHSO_3$, 38-40% in water) are added at 22° C. 138.6 g of hexamethylene diisocyanate in one portion under agitation. The temperature of the reaction mixture is then raised to 50° C. during 45 minutes. At this point, the mixture has reached a pH of 5.27.

This was followed by the addition of 7.8 g of citric acid monohydrate dissolved in 7.8 g of water resulting in a pH of 3.86.

This is followed by stirring at 50° C. for 1 hour during which the pH rises to 4.95. The reaction mixture is already clear and is cooled down to 20° C. during 2 hours. This is followed by stirring at room temperature (20-23° C.) for 2 hours. The pH of the solution is 4.84. This is followed by the addition of 45.8 g of citric acid monohydrate dissolved in 45.8 g of water and adjustment of the concentration with 21.8 g of water to obtain a clear 35.6% strength solution of pH 2.80.

Storage at 40'C/4 weeks: clear homogeneous solution, pH 3.14

Storage at 20° C./4 weeks: clear homogeneous solution, pH 2.70.

Efficacy after thermal treatment at 40° C./4 weeks: 100%

Example A11

7.14% of Component b) Based on HDI

To a solution of 19.4 g of C12-C16 alkylglucoside (DP 1.4) (51% in water) (e.g. Glucopon 600 CS UP, Cognis), in 317 g of water and 461.7 g of sodium bisulphite solution ($NaHSO_3$, 38-40% in water) are added at 22° C. 138.6 g of hexamethylene diisocyanate in one portion under agitation. The temperature of the reaction mixture is then raised to 50° C. during 55 minutes. At this point, the mixture has reached a pH of 5.04.

This was followed by the addition of 7.8 g of citric acid monohydrate dissolved in 7.8 g of water resulting in a pH of 3.87.

This is followed by stirring at 50° C. for 1 hour during which the pH rises to 5.04. The reaction mixture is almost clear and is cooled down to 20° C. during 2 hours. This is followed by stirring at room temperature (20-23° C.) for 2 hours. The pH of the solution is 5.01. This is followed by the addition of 30.4 g of citric acid monohydrate dissolved in 23.6 g of water and adjustment of the concentration with 6.8 g of water to obtain a transparent, almost clear 35.4% strength solution of pH 3.07.

Storage at 40° C./4 weeks: 2 phases which are miscible after cooling to 20° C., pH 3.58

Storage at 20° C./4 weeks: almost clear homogeneous solution, pH 2.99.

Efficacy after thermal treatment at 40'C/4 weeks: 100%

Example A12

7.14% of Component b) Based on HDI

To a solution of 9.9 g of hydrogenated castor oil ethoxylate (e.g. Eumulgin HRE 40, Cognis), which is alkoxylated with altogether 40 ethylene oxide units (HLB 14.0), in 326.5 g of water and 461.7 g of sodium bisulphite solution (NaHSO$_3$, 38-40% in water) are added at 20° C. 138.6 g of hexamethylene diisocyanate in one portion under agitation. The temperature of the reaction mixture is then raised to 50° C. during 45 minutes. At this point, the mixture has reached a pH of 6.01.

This was followed by the addition of 7.8 g of citric acid monohydrate dissolved in 7.8 g of water resulting in a pH of 3.80.

This is followed by stiffing at 50° C. for 1 hour during which the pH rises to 4.30. The reaction mixture is clear and is cooled down to 20° C. during 2 hours. This is followed by stirring at room temperature (20-23° C.) for 2 hours. The pH of the solution is 4.18. This is followed by the addition of 23.6 g of citric acid monohydrate dissolved in 23.6 g of water and adjustment of the concentration with 15.0 g of water to obtain a clear 35.0% strength solution of pH 3.02.

Storage at 40° C./4 weeks: clear homogeneous solution, pH 3.55

Storage at 20° C./4 weeks: slightly cloudy clear homogeneous solution, pH 2.91.

Efficacy after thermal treatment at 40° C./4 weeks: 100%

Example A13

7.1% of Component b) Based on HDI

To a solution of 9.9 g of polyoxyethylene (20) glycerol monostearate (e.g. Cutina® E24, Cognis), which is alkoxylated with altogether 20 ethylene oxide units per glycerol unit (HLB 13.5), in 326.5 g of water and 461.7 g of sodium bisulphite solution (NaHSO$_3$, 38-40% in water) are added at 22° C. 138.6 g of hexamethylene diisocyanate in one portion under agitation. The temperature of the reaction mixture is then raised to 50° C. during 40 minutes. At this point, the mixture has reached a pH of 5.67.

This was followed by the addition of 7.8 g of citric acid monohydrate dissolved in 7.8 g of water resulting in a pH of 3.80.

This is followed by stirring at 50° C. for 1 hour during which the pH rises to 4.79. The reaction mixture is clear and is cooled down to 20° C. during 2 hours. This is followed by stirring at room temperature (20-23° C.) for 2 hours. The pH of the solution is 4.69. This is followed by the addition of 33.6 g of citric acid monohydrate dissolved in 33.6 g of water and adjustment of the concentration with 15.0 g of water to obtain a transparent, almost clear 35.2% strength solution of pH 2.82.

Storage at 40° C./4 weeks: clear homogeneous solution, pH 3.30

Storage at 20° C./4 weeks: transparent, almost clear solution, pH 2.86.

Efficacy after thermal treatment at 40° C./4 weeks: 100%

Example A14

7.1% of Component b) Based on HDI

To a solution of 9.8 g of sorbitan polyethylene glycol (30) monododecanoate, which is alkoxylated with altogether 30 ethylene oxide units per sorbitan unit (HLB 17.6), in 326.5 g of water and 461.7 g of sodium bisulphite solution (NaHSO$_3$, 38-40% in water) are added at 20° C. 138.6 g of hexamethylene diisocyanate under agitation for 5 minutes. The temperature of the reaction mixture is then raised to 50° C. during 30 minutes. Then 7.8 g of citric acid monohydrate dissolved in 6.5 g of water was added.

This is followed by stirring at 50° C. for 1 hour during which the reaction mixture clarifies. It is then cooled down to 23° C. during 2 hours. This is followed by stirring at room temperature (20-23° C.) for 1 hour. The pH of the solution is 3.91. This is followed by the addition of 23.6 g of citric acid monohydrate dissolved in 19.5 g of water and adjustment of the concentration by addition of 26.4 g of water to obtain a clear 35.2% strength solution of pH 2.75.

Storage at 40° C./4 weeks: clear homogeneous solution, pH 3.50.

Storage at 20° C./4 weeks: clear homogeneous solution, pH 2.90.

Efficacy after thermal treatment at 40° C./4 weeks: 100%

Example A15

7.1% of Component b) Based on HDI

To a solution of 9.8 g of sorbitan polyethylene glycol (15) monododecanoate, which is alkoxylated with altogether 15 ethylene oxide units per sorbitan unit (HLB 16.0), in 326.5 g of water and 461.7 g of sodium bisulphite solution (NaHSO$_3$, 38-40% in water) are added at 20° C. 138.6 g of hexamethylene diisocyanate under agitation for 5 minutes. The temperature of the reaction mixture is then raised to 50° C. during 30 minutes. Then 7.8 g of citric acid monohydrate dissolved in 6.5 g of water are added.

This is followed by stirring at 50° C. for 1 hour during which the reaction clarifies. It is then cooled down to 23° C. during 2 hours. This is followed by stirring at room temperature (20-23° C.) for 1 hour. The pH of the solution is 3.85. This is followed by the addition of 23.6 g of citric acid monohydrate dissolved in 19.5 g of water and adjustment of the concentration by addition of 26.4 g of water to obtain a clear 35.2% strength solution of pH 2.80.

Storage at 40° C./4 weeks: clear homogeneous solution, pH 3.35.

Storage at 20° C./4 weeks: clear homogeneous solution, pH 2.70.

Efficacy after thermal treatment at 40° C./4 weeks: 100%

Example A16

7.1% of Component b) Based on HDI

A solution of 1334.0 g of water and 351.6 g of sodium metabisulphite ($Na_2S_2O_5$) was used to dissolve 21.0 g of sorbitan polyethylene glycol (20) monododecanoate (e.g. Eumulgin SML 20 (Cognis) or Tween 20 (Croda)), which is alkoxylated with altogether 20 ethylene oxide units per sorbitan unit (HLB 16.7). At 40° C., 296.4 g of hexamethylene diisocyanate were added in one portion under agitation. After 10 minutes a temperature of 50° C. is reached. At this point, the mixture has reached a pH of 4.89. The mixture is subsequently stirred at 50° C. for 1 hour during which the pH rises to 6.30 within 20 minutes and then remains constant. The reaction mixture is slightly cloudy and is cooled down to 20° C. during 2 hours. It is subsequently stirred at room temperature (20-23° C.) for 2 hours. The pH of the solution is 6.12. This is followed by the addition of 48.1 g of citric acid monohydrate in solid form and adjustment of the concentration with water. After filtration a clear 35% strength solution of pH 2.95 is obtained.

Storage at 40° C./4 weeks: clear homogeneous solution, pH 3.85

Storage at 20° C./4 weeks: clear homogeneous solution, pH 3.15.

Efficacy after thermal treatment at 40° C./4 weeks: 90%

Example A17

17.4% of Component b) Based on HDI

A solution of 3700.0 g of water and 1013.1 g of sodium metabisulphite ($Na_2S_2O_5$) was used to dissolve 142.0 g of sorbitan polyethylene glycol (20) monododecanoate (e.g. Eumulgin SML 20 (Cognis) or Tween 20 (Croda)), which is alkoxylated with altogether 20 ethylene oxide units per sorbitan unit (HLB 16.7). Starting at 22° C., 815.3 g of hexamethylene diisocyanate were added during 2 hours under agitation. After a further 30 minutes the mixture has reached a pH of 5.77 and 32° C. This is followed by 5.5 hours of stirring with slight cooling at a temperature at 20 to 30° C., during which the pH drops to 5.68, The reaction mixture is cloudy and is left to stand overnight. The still slightly cloudy solution is admixed with 46.2 g of citric acid monohydrate and 300 g of water. Filtration gives a clear 34.5% strength solution of pH 3.35.

Storage at 40° C./4 weeks: clear homogeneous solution, pH 4.25

Storage at 20° C./4 weeks: clear homogeneous solution, pH 3.45.

Efficacy after thermal treatment at 40° C./4 weeks: 90%

B) Use Examples (Tannings)

The quantities of the particular products used (e.g. commercial products as supplied) are based on the weight of the raw material used or of the intermediate products.

B 1: Medical Sheepskin, Chromium-Free

In a paddle customary in the industry, air-dried sheepskins are wetted back with 20 l of water per skin and 2.0 g/l of a nonionic emulsifier based on a fatty alcohol ethoxylate at 25° C. overnight and subsequently fleshed. The skins thus prepared are degreased twice at 35° C. in aqueous float with 2.0 g/l of a nonionic emulsifier based on a fatty alcohol ethoxylate for 60 min each time and, after the float has been dropped, thoroughly rinsed with warm water.

To prepare for tannage, new float is initially charged and without pickling admixed at 25° C. with 14-16 g/l of inventive product from Example A2. Magnesium oxide is added in three doses to raise the pH to 8.8 in steps and then the temperature is raised to 40° C.

Following a can time of 12 h, 7 g/l of sulphated synthetic fatliquoring agent and 2.0 g/l of lecithin-based dispersing assistant are introduced into the same bath. After 2 h, the pH is reduced to 5.5 with formic acid. After the float has been dropped, the skins are thoroughly washed with cold water and finalized in a commercially customary manner, and have a shrinkage temperature of 77° C.

Compared with skins tanned with glutaraldehyde in the commercially customary manner, the inventive skins have a distinctly lighter colour not only for the leather but also for the wool, and better lightfastness. In the DIN 53315 A aldehyde test, the measured values are distinctly reduced compared with the prior art and are below the method's detection limit of 20 ppm.

B 2: Production of Wet White for Full-Grained Upholstery Leather

Salted cattle hides are washed, limed, unhaired, fleshed and split in the commercially customary manner. The pelt material (2.7 mm) is washed with 200% of water and the float is dropped. For deliming, the pelts are agitated in 30% of fresh water with 0.4% of sodium bisulphite and 1.4% of an N-free deliming agent (Decaltal® A-N, product from BASF) for 10 minutes. Then, 0.15% of a degreasing agent based on fatty alcohol ethoxylate is added followed by agitation at 25° C. for 1 h (pH 8.4). Then, 50% of water and 1% of a bating enzyme (Novobate 1547, product from Novozyme) are added followed by agitation for 1 hour. The float is then dropped and the pelt washed again.

In 50% of fresh float, the pelt is conditioned for 1 hour with 0.25% of magnesium oxide at pH 9.5 and admixed with 8% of the inventive product from Example A4 (diluted 1:1 with water), resulting in a pH of 8.3. After 3 hours, 0.3% of magnesium oxide is added to raise the float pH to 9.0-9.5 and the shrinkage temperature is measured. Following a run time of 1 hour, 0.2% of magnesium oxide and 0.1% of an aqueous ammonia solution (diluted 1:5 with water) are added (the pH is 9.1 after 1 hour) and the drum is agitated at 35° C. overnight (pH 9.2).

To prepare for retanning, the pH is reduced to 5.3 with 0.6% of formic acid (diluted 1:5 with water) in 3 portions. The float is dropped after 90 minutes. The wet white leathers are washed and sammed. The shrinkage temperature is again measured (77° C.) and the leather is shaved down to 1.0 mm.

Further tests to assess the quality of the tannage are carried out in a similar manner. Some of the results are summarized in the following table:

| Product | Ts (° C.) | Grain pattern | Handle | Sammability | Shavability |
|---|---|---|---|---|---|
| (comparison 1) | 70 | drawn grain | slightly fatty | still acceptable | still acceptable |
| (comparison 2) | 73 | drawn grain | slightly fatty | still acceptable | still acceptable |
| A1 | 76 | smooth | dry, firm | very good | very good |
| A2 | 77 | smooth | dry, firm | very good | very good |
| A3 | 76 | smooth | dry, firm | very good | very good |
| A4 | 77 | smooth | dry, firm | very good | very good |
| A5 | 79 | smooth | dry, firm | very good | very good |
| A6 | 77 | smooth | dry, firm | very good | very good |
| A7 | 76 | smooth | dry, firm | very good | very good |
| A8 | 74 | smooth | dry, firm | very good | good |
| A9 | 73 | smooth | dry, firm | very good | good |
| A10 | 77 | smooth | dry, firm | very good | very good |
| A11 | 74 | smooth | dry, firm | good | good |
| A12 | 75 | smooth | dry, firm | very good | very good |
| A13 | 78 | smooth | dry, firm | very good | very good |
| A14 | 75 | smooth | dry, firm | very good | good |
| A15 | 76 | smooth | dry, firm | very good | very good |
| A16 | 78 | smooth | dry, firm | very good | very good |
| A17 | 78 | smooth | dry, firm | very good | very good |

Ts = shrinkage temperature in ° C.;
wet white: leather intermediate product tanned without chromium and intended for mechanical treatment and further (re)tanning.

B 3: Production of Wet White for Full-Grained Upholstery Leather

Salted cattle hides are washed, limed, unhaired, fleshed and split in the commercially customary manner. The pelt material (2.7 mm) is washed with 200% of water and the float is dropped. For deliming, the pelts are agitated in 30% of fresh water with 0.4% of sodium bisulphite and 1.4% of an N-free deliming agent (Decaltal A-N, product from BASF) for 10 minutes. Then, 0.15% of a degreasing agent based on fatty alcohol ethoxylate is added followed by agitation at 25° C. for 1 h (pH 8.4). Then, 50% of water and 1% of a bating enzyme (Novobate® 1547, product from Novozyme) are added followed by agitation for 1 hour. The float is then dropped and the pelt washed again.

In 50% of fresh float, the pelt is conditioned for 1 hour with 0.25% of magnesium oxide at pH 9.5 and admixed with 8% of the inventive product from Example A4 (diluted 1:1 with water), resulting in a pH of 8.7. After 1 hour penetration time, 2.0% of a 4,4'-dihydroxydiphenyl sulphone/naphthalenesulphonic acid/formaldehyde condensate (e.g. TANIGAN® BN, product from LANXESS) and 1% of the formaldehyde condensate of aromatic sulphonic acids (e.g. TANIGAN® PR, product from Lanxess) are added. After a further 2 hours (pH 7.8), 0.2% of magnesium oxide and 0.1% of an aqueous ammonia solution (diluted 1:5 with water) are added (the pH is 9.0 after 1 hour) and the shrinkage temperature is measured. The drum is agitated at 35° C. overnight (pH 8.9).

To prepare for retanning, the pH is reduced to 5.3 with 0.6% of formic acid (diluted 1:5 with water) in 3 portions. The float is dropped after 90 minutes. The wet white leathers are washed and sammed. The shrinkage temperature is again measured (76° C.) and the leather is shaved down to 1.0 mm.

B 4: Production of Wet White for an Upholstery Leather:

Salted cattle hides are washed, limed, unhaired, fleshed and split in the commercially customary manner. The pelt material (2.7 mm) is washed with 200% of water and the float is dropped. For deliming, the pelts are agitated in 30% of fresh water with 0.4% of sodium bisulphite and 1.5% of an N-free deliming agent (Decaltal® A-N, product from BASF) for 10 minutes. Then, 0.15% of a degreasing agent based on fatty alcohol ethoxylate is added followed by agitation at 25° C. for 90 minutes (pH 8.5). Then, 50% of water and 1% of a bating enzyme (Novobate® 1547, product from Novozyme) are added followed by agitation for 45 minutes. The float is then dropped and the pelt washed again.

In 50% of float, the prepared pelt is conditioned with 1% of sodium acetate and 1% of sodium carbonate at pH 9.9 and then admixed with 8.0% of the inventive product from Example A4 (diluted 1:1 with water), resulting in a pH of 8.6. After 30 minutes' penetration time, 4% of a 4,4'-dihydroxydiphenyl sulphone/naphthalenesulphonic acid/formaldehyde condensate (e.g. TANIGAN® BN, product from LANXESS) and 2% of a formaldehyde condensate of aromatic sulphonic acids (e.g. TANIGAN® PR, product from Lanxess) are added (addition as 50% solutions, pH 7). After 1 hour (pH 8.2) portionwise addition of altogether 1% of sodium carbonate (diluted 1:10 with water) is used to raise the float pH to 8.7 over 2 hours, and the shrinkage temperature is measured. The leather is subsequently agitated at 30° C. overnight (pH 8.1).

To prepare for retanning, the pH is reduced to 7.2 with 0.6% of formic acid (diluted 1:10 with water) in 3 portions, the float is dropped and the wet white leather is sammed. The shrinkage temperature is measured (70° C.) and the leather is shaved down to 1.0 mm.

B 5: Production of Wet White for Shoe Upper Leather

Salted cattle hides are washed, limed, unhaired, fleshed and split in the commercially customary manner. The pelt material (2.6 mm) is washed with 200% of float and the float is dropped. For deliming, the pelts are agitated in the drum in 100% of float and 0.3% of sodium bisulphite, 1.0% of an N-free deliming agent (e.g. Decaltal® ES-N, product from BASF) and also 0.3% of a mixture of dicarboxylic acids (e.g. Bascal® S, product from BASF) for 1 hour at 25° C. At pH 7.7, 1% of a bating enzyme (Novobate 1547, product from Novozyme) and 0.1% of a degreasing agent based on fatty alcohol ethoxylate are added followed by agitation for a further 45 minutes and the float is then dropped and the pelt washed twice.

The prepared pelt is conditioned for 1 hour with 1% of sodium acetate at pH 8.0 and admixed with 2% of the inventive product from Example A4 (diluted 1:1 with water). After 20 minutes' penetration time, 0.2% of sodium carbonate (diluted 1:10 with water) is added followed by 30 minutes of agitation. Then, a further 4% of the inventive product from Example A4 (diluted 1:1 with water) are added. After 1.5 hours, portionwise addition of altogether 0.4% of sodium carbonate (diluted 1:10 with water) is used to raise the pH to 8.2 over 2 hours, and the shrinkage temperature is measured. Then, 0.1% of NH3 solution (diluted 1:5 with water) is added and the drum is agitated overnight at 35° C. Then, the pH is reduced to 7.0 with formic acid (diluted 1:10 with water). This is followed by the addition of 3.0% of a 4,4'-dihydroxydiphenyl sulphone-based tanning agent (e.g. TANIGAN® HO, product from Lanxess) and agitation of the drum for 2 hours. The float is then dropped. The wet white leathers are washed and sammed. The shrinkage temperature is remeasured (72° C.). The leathers can be processed without problems and are shaved to a thickness of 1.2 mm.

B 6: Automotive Upholstery Leather Tanned without Chromium:

The shaved wet white leathers from Example B 4 are agitated with 300% of water (35° C.) and 0.2% of a fatty alcohol ethoxylate at pH 7.6 for 20 minutes. After the float has been dropped, 50% of water, 3% of a naphthalenesulphonic acid/formaldehyde condensate (TANIGAN® RFS, product from LANXESS), 1.5% of sodium formate and, for preliminary fatliquoring, 3% of a lecithin-based fatliquoring agent (BAYKANOL® Licker SL, product from Lanxess) (diluted 1:8 with water) is added. Following a run time of 30 minutes, 2% of a polyacrylate dispersion (LEUKOTAN® 1084, product from Dow/Lanxess) (diluted 1:3 with water) and after a further 10 minutes 3% of a modified polyamide carboxylic acid (LEVOTAN® L, product from Lanxess) (diluted 1:3 with water) are added as filling and softening retanning agents, After a further 10 minutes of run time, 8% of tara and 5% of a synthetic tanning agent based on a 4,4'-dihydroxydiphenyl sulphone/naphthalenesulphonic acid/formaldehyde condensate (TANIGAN® BN, product from LANXESS) and after 30 minutes (pH 5.5) additionally 8% of mimosa and a further 5% of a synthetic tanning agent based on a 4,4'-dihydroxydiphenyl sulphone/naphthalenesulphonic acid/formaldehyde condensate (TANIGAN® BN, product from LANXESS) are added. This is followed by dyeing for 2 hours with 3% of dye (pH 5.5-5.8). After refloating with 50% of water, a further 4% of a lecithin-based fatliquoring agent (BAYKANOL® Licker SL, product from Lanxess) (diluted 1:8 with water) is added followed by tumbling at 50° C. for 1 hour. Then, 2% of formic acid (diluted 1:5 with water) is added in 2 portions for 45 minutes for fixing (pH 4) and the float is dropped. The leather is washed with 200% of water (50° C.).

A fresh float (100% of water, 50° C.) incorporating 4% of a lecithin-based fatliquoring agent (BAYKANOL® Licker SL, product from Lanxess) (diluted 1:8 with water) is used to perform the top fatliquoring in the course of a run time of 1 hour. The leather is then acidified with 1% of formic acid (diluted 1:5 with water) to pH 3.4 in 2 steps followed by fixing for 45 minutes. The float is then dropped, the leather is washed twice with 200% of water and finalized in a commercially customary manner by setting out, vacuum drying (50° C.), suspension drying, staking, milling, staking.

This gives very soft and yet tight-grained, level-dyed crust leathers having a very uniform milled grain, which are finishable with excellent results.

B 7: Shoe Upper Leather Tanned without Chromium:

The shaved wet white leathers from Example B 5 are washed at 35° C. in 150% float with 0.3% of formic acid (diluted 1:10 with water) for 20 min (pH 4.3) and the float is dropped.

A fresh float (100% of water 30° C.) is used to subject the leathers to a preliminary fatliquoring with a mixture of 2% of a synthetic fatliquoring agent and 1% of a lecithin-based fatliquoring agent (diluted 1:8 with water) and 5% of a 4,4'-dihydroxydiphenyl sulphone-based tanning agent (TANIGAN® 3LN, product from Lanxess). After 20 minutes, 10% of a dihydroxydiphenyl sulphone/naphthalenesulphonic acid/formaldehyde condensate (TANIGAN® CF liquid, product from LANXESS) (diluted 1:1 with water) is added in 2 portions and drummed in for 45 minutes (pH 4.5). Then, 70% of water and 2% of a dispersant based on aromatic sulphonic acids (TANIGAN® PAK, product from Lanxess) are added.

Following a run time of 15 minutes, initially 4% of a modified polyamide carboxylic acid (LEVOTAN LB, product from Lanxess) (diluted 1:3 with water) and 3% of a polyacrylate dispersion (LEUXOTAN® 8090, product from Dow/Lanxess) are added. After a further 20 minutes, a mixture of 3% of a synthetic fatliquoring agent and 2% of a lecithin-based fatliquoring agent (BAYKANOL® Licker FSU and SL, products from Lanxess) (diluted 1:5 with water) is added followed after a further 15 minutes by a mixture of 5% of mimosa and 12% of synthetic tanning agents based on 4,4'-dihydroxydiphenyl sulphone/formaldehyde condensates (TANIGAN® VR, TANIGAN® 3LN, product from LANXESS). Following a run time of 30 minutes, the leathers are sweetened with 12% of a mixture of chestnut and fully tanned and dyed with synthetic tanning agents based on a dihydroxydiphenyl sulphone/naphthalenesulphonic acid/formaldehyde condensate (TANIGAN VR, products from LANXESS) and a resin tanning agent (RETINGAN® ZF Plus, product from Lanxess) in the presence of 1% of dye and 2% of a dyeing auxiliary (BAYKANOL® TF-2N, product from Lanxess).

The next morning, following addition of 100% of water (50° C.), a top fatliquoring is performed with a mixture of 3% of a lecithin-based fatliquoring agent, 3% of a lanolin-based fatliquoring agent (BAYKANOL® Licker LA, product from Lanxess), 2% of a synthetic fatliquoring agent (BAYKANOL® Licker SL, FSU, products from Lanxess,) and also 1% of neatsfoot oil (e.g. Atlas Neatsfoot® Oil 30 CT) (diluted 1:5 with water). Following a run time of 60 minutes, the levels are fixed with 3% of formic acid (diluted 1:10 with water) in 3 portions in the course of 80 minutes (pH 3.6) and the float is dropped. The leathers are washed and finalized in a commercially customary manner.

This gives very soft and yet tight-grained, level-dyed crust leathers having a very uniform milled grain, which are finishable with excellent results.

C: Production of Wet White for Insole Leather:

Salted cattle hides are washed, limed, unhaired, fleshed, and split in a commercially customary manner. The pelt material (2.7 mm) is washed with 150% of water and the float is dropped. For deliming, the pelts are agitated in 30% of fresh water with 0.2% of sodium bisulphite and 0.5% of an N-free deliming agent (Blancorol CGA, product from LANXESS) for 10 minutes. Then, 0.1% of a fatty alcohol ethoxylate-based degreasing agent is added followed by agitating at 25° C. for 90 minutes (pH 8.5). The float is then dropped and the pelt is washed again.

The prepared pelt is conditioned to pH 8 in 50% float and then admixed with 6.0% of the inventive product from Example A4 (diluted 1:1 with water) to give a pH of 7.55.

After 2 hours (pH 7.55), 0.3% of sodium carbonate (diluted 1:10 with water) is added. After a further 60 minutes (pH 8.0), a further 0.3% of sodium carbonate (diluted 1:10 with water) is added (pH 8.2). The leather is subsequently agitated overnight at 40° C. (pH 7.44). The shrinkage temperature is 74° C.

The next morning, 0.5% of a preservative (Preventol U-TECH G, product from LANXESS) is added. Following a run time of 20 minutes, 2 portions of formic acid (diluted 1:10) are added 20 minutes apart, each in an amount of 0.4%.

The drum is allowed to run for 1 hour (pH 4.5). The float is then dropped and the leathers are washed.

The leathers are sammed and shaved. The shaved leathers are watered with 200% of water based on shaved weight at 30° C. The float is dropped.

This is followed by the addition, in each case based on shaved weight, of 100% of water (30° C.) and 20.0% of a syntan based on 4,4'-dihydroxydiphenyl sulphone and naphthalenesulphonic acid (e.g. TANIGAN CF liquid) (diluted 1:2). The drum is allowed to run for 90 minutes (pH 4.1). This is followed by aftertreatment with 1.0% of formic acid (diluted 1:10) for 30 minutes (pH 3.5) and the float is dropped.

The leathers are as usual set out, vacuumed at 50° C. for 5 minutes, stenter dried and finalized as usual.

The leathers dyed without mineral tanning agents provide outstanding insole leathers and are also suitable for orthopaedic and medical shoes as well as children's shoes.

What is claimed is:

1. Aqueous composition comprising:
   a) at least one compound containing carbamoylsulphonate groups; and
   b) at least one of:
      b1) at least one nonionic alkoxylated polyol containing ester groups and having an HLB value of at least 13; and
      b2) at least one alkylglycoside.

2. The aqueous composition according to claim 1, wherein the component a) is a reaction product of organic polyisocyanates and at least one of bisulphite and disulphite.

3. The aqueous composition according to claim 1, containing
   5 to 50 wt % of the component a) compound containing carbamoylsulphonate groups, and
   0.05 to 5 wt % of the compound of component b)
   all based on the composition.

4. The aqueous composition according to claim 2, wherein the organic polyisocyanate is a polyisocyanate having an NCO functionality of 1.8 to 4.2 and a molecular weight of <800 g/mol.

5. The aqueous composition according to claim 2, wherein the organic polyisocyanate has a molecular weight of less than 400 g/mol and NCO groups attached to aliphatics or cycloaliphatics.

6. The aqueous composition according to claim 1, wherein the compound of component b1) is the reaction product of a polyol with at least one alkylene oxide of 2 to 6 carbon atoms in an amount of 10 to 60 mol equivalents, based on the polyol and subsequent reaction with at least one carboxylic acid of 6 to 30 carbon atoms.

7. The aqueous composition according to claim 6, wherein the polyol is a polyol from the group consisting of glycerol, trimethylolpropane, pentaerythritol, dipentaerythritol and polyols derived from mono- and polysaccharides.

8. The aqueous composition according to claim 1, wherein the compound of component b2) comprises alkylmonoglucosides, alkyldiglucosides, alkyl-triglucosides, or higher homologues and mixtures thereof, the hydroxyl groups of which are partially substituted with $C_6$-$C_{18}$-alkyl groups.

9. The aqueous composition according to claim 1, further comprising products from the groups of synthetic tanning agents.

10. The aqueous composition according to claim 1, further comprising component c) a carboxylic acid.

11. Leathers and furs treated with a composition according to claim 1.

12. Compounds containing carbamoylsulphonate groups, said compounds being a reaction product of at least one organic isocyanate with at least one bisulphite and/or disulphite, and at least one carboxylic acid, in the presence of at least one of a nonionic alkoxylated polyol containing ester groups and having an HLB of at least 13 (b1) and an alkyl glycoside (b2).

13. The aqueous composition according to claim 2, wherein:
   the composition contains
      10 to 40 wt % of the component a) compound containing carbamoylsulphonate groups, and
      0.1 to 2 wt % of the compound of component b)
      all based on the composition; and
   component c) a carboxylic acid; and
   the organic polyisocyanate is a polyisocyanate having an NCO functionality of 1.8 to 2.5 and a molecular weight <400 g/mol.

14. The aqueous composition according to claim 13, wherein:
   the polyol is at least one of a polyol derived from and a polyols with sorbitan core scaffold;
   the carboxylic acid is selected from the group consisting of citric acid, lactic acid, tartaric acid, and combinations thereof;
   the organic polyisocyanate is selected from the group consisting of 1,4-diisocyanatobutane, 1,6-diisocyanatohexane (HDI), 1,5-diisocyanato-2,2-dimethylpentane, 2,2,4- or 2,4,4-trimethyl-1,6-diisocyanatohexane (TMHI), 1,3- and 1,4-diisocyanatohexane, 1,3- and 1,4-diisocyanatocyclohexane (CHDI) and also any desired mixtures of these isomers, 1-isocyanato-2-isocyanatomethylcyclopentane, 1,2-, 1,3- and 1,4-bis(isocyanatomethyl)-cyclohexane and also any desired mixtures of isomers, 1,2-, 1,3- and 1,4-bis(isocyanato-ethyl)cyclohexane and also any desired mixtures of these isomers, 1,2-, 1,3- and 1,4-bis(isocyanato-n-propyl)cyclohexane and also any desired mixtures of these isomers, 1-isocyanatopropyl-4-isocyanatomethylcyclohexane and isomers, 1-isocyanato-3,3,5-trimethyl-5-isocyanatomethylcyclohexane (IPDI), 1-isocyanato-1-methyl-4-isocyanatomethylcyclohexane (IMCI), 2,4'- and 4,4'-diisocyanatodicyclohexylmethane ($H_{12}$MDI) and isomers, dimeryl diisocyanate (DDI), bis(isocyanatomethyl)bicyclo[2.2.1]heptane (NBDI), bis(isocyanatomethyl)tricyclo[5.2.1.0$^{2,6}$]decane (TCDDI) and isomers and any desired mixtures of such diisocyanates and xylylenediisocyanates of the formulae

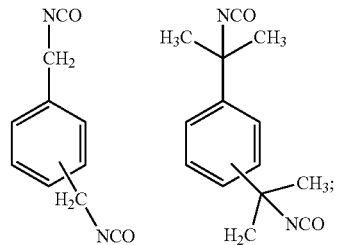

and
   the composition further comprises at least one of resin tanning agents, polymeric retanning agents, vegetable tanning agents, fatliquoring agents, filers, and buffers.

* * * * *